(12) United States Patent
Lester et al.

(10) Patent No.: US 7,003,092 B1
(45) Date of Patent: *Feb. 21, 2006

(54) AUTOMATED MICROPHONE SWITCH CONTROLLED BY A CTI COMBO

(75) Inventors: Leland Lester, Austin, TX (US); David Iglehart, Austin, TX (US); Stephen J. Swain, Round Rock, TX (US); William Joseph Beyda, Cupertino, CA (US)

(73) Assignee: Siemens Communictions, Inc., Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/148,533

(22) Filed: Sep. 4, 1998

(51) Int. Cl.
*H04M 1/00* (2006.01)

(52) U.S. Cl. .............................. 379/387.01; 379/388.06
(58) Field of Classification Search ................ 379/201, 379/242, 88, 93.06, 387, 110.01, 387.01, 379/388.06; 455/556.1, 556.2, 575.2, 557
See application file for complete search history.

(56) References Cited

U.S. PATENT DOCUMENTS

| | | | | |
|---|---|---|---|---|
| 4,517,413 A | * | 5/1985 | Pavitt, Jr. .............. | 379/110.01 |
| 5,233,646 A | * | 8/1993 | Kuromi ................. | 379/102.03 |
| 5,655,014 A | * | 8/1997 | Walsh et al. ................ | 379/201 |
| 5,822,406 A | * | 10/1998 | Brown ......................... | 379/88 |
| 6,091,812 A | * | 7/2000 | Iglehart et al. ......... | 379/110.01 |

* cited by examiner

*Primary Examiner*—Jefferey F. Harold

(57) ABSTRACT

An apparatus and method are disclosed for connecting a headset microphone alternately to a telephone line and an alternative device. The apparatus includes a device connector for connecting the apparatus to the alternative device, a telephone connector for connecting the apparatus to the telephone line, and a microphone connector for connecting the apparatus to the microphone. The apparatus also includes a switching circuit connected to the device, telephone, and headset connectors. The switching circuit can be used with or included in a CTI module. The switching circuit connects the telephone connector to the headset connector in response to sensing a voltage greater than a predetermined threshold on the telephone line. When the voltage sensed returns to a value less than the predetermined threshold value, the switching circuit reconnects the headset connector to the device connector.

20 Claims, 5 Drawing Sheets

FIG_2

FIG_3

US 7,003,092 B1

AUTOMATED MICROPHONE SWITCH CONTROLLED BY A CTI COMBO

FIELD OF THE INVENTION

The present invention relates to telephone headsets and the like, and more particularly, to an apparatus for switching a headset microphone between a telephone and a second device.

BACKGROUND OF THE INVENTION

Headsets provide a number of advantages for both telephone communication and operation of computer or recording devices. Consider a worker who works in an environment in which he and his co-workers work in open cubicles instead of closed offices. The worker finds it advantageous to use a headset when making telephone calls, since the headset reduces the interference from the background noise in the work place, and also frees the worker's hands to type on a workstation during the call. If the user uses voice control programs on the computer or voice recording devices, each time the worker switches between the telephone and another use, she must remove her headset. During hectic times of alternate telephone calls and computer or recording device use, switching between devices can cause error or greatly reduce efficiency.

Broadly, it is the object of the present invention to provide an improved telephone headset arrangement.

It is a further object of the present invention to provide an apparatus that allows the user to conveniently switch voice path between a telephone call and a personal computer (PC) or audio recording device without removing the user's headset.

These and other objects of the present invention will become apparent to those skilled in the art from the following detailed description of the invention and the accompanying drawings.

SUMMARY OF THE INVENTION

The present invention is an apparatus for connecting a headset microphone alternately to a telephone line or to a second device, such as a PC or recording device. Preferably, the system uses a computer telephone integration (CTI) module. The apparatus includes a switching circuit with connectors to the device, telephone and headset. The switching circuit connects the telephone connector to the headset connector in response to an off-hook condition; the microphone is automatically connected when the telephone is answered. Alternatively, the voice path connector can connect to the telephone upon sensing a voltage greater than a predetermined threshold on the telephone line; the microphone switches to the telephone in response to a ring. When the voltage sensed returns to a value less than the predetermined threshold value (when the telephone goes on-hook), the switching circuit reconnects the microphone to the alternative device.

DETAILED DESCRIPTION OF THE PREFERRED EMBODIMENTS

The present invention is an apparatus that connects a headset microphone to either a telephone line or a second device, such as a personal computer or a recording device. The user wears a single headset for both uses. The user switches from the alternative device to the telephone by causing the telephone to go off hook. Alternatively, a telephone ring signal can cause the module to switch to the telephone microphone. The present invention senses the voltage on the telephone input and switches the headset to the telephone connection from the alternative device connection. When the telephone goes back on hook, the apparatus of the present invention reconnects the headset to the alternative device.

Figure 1:
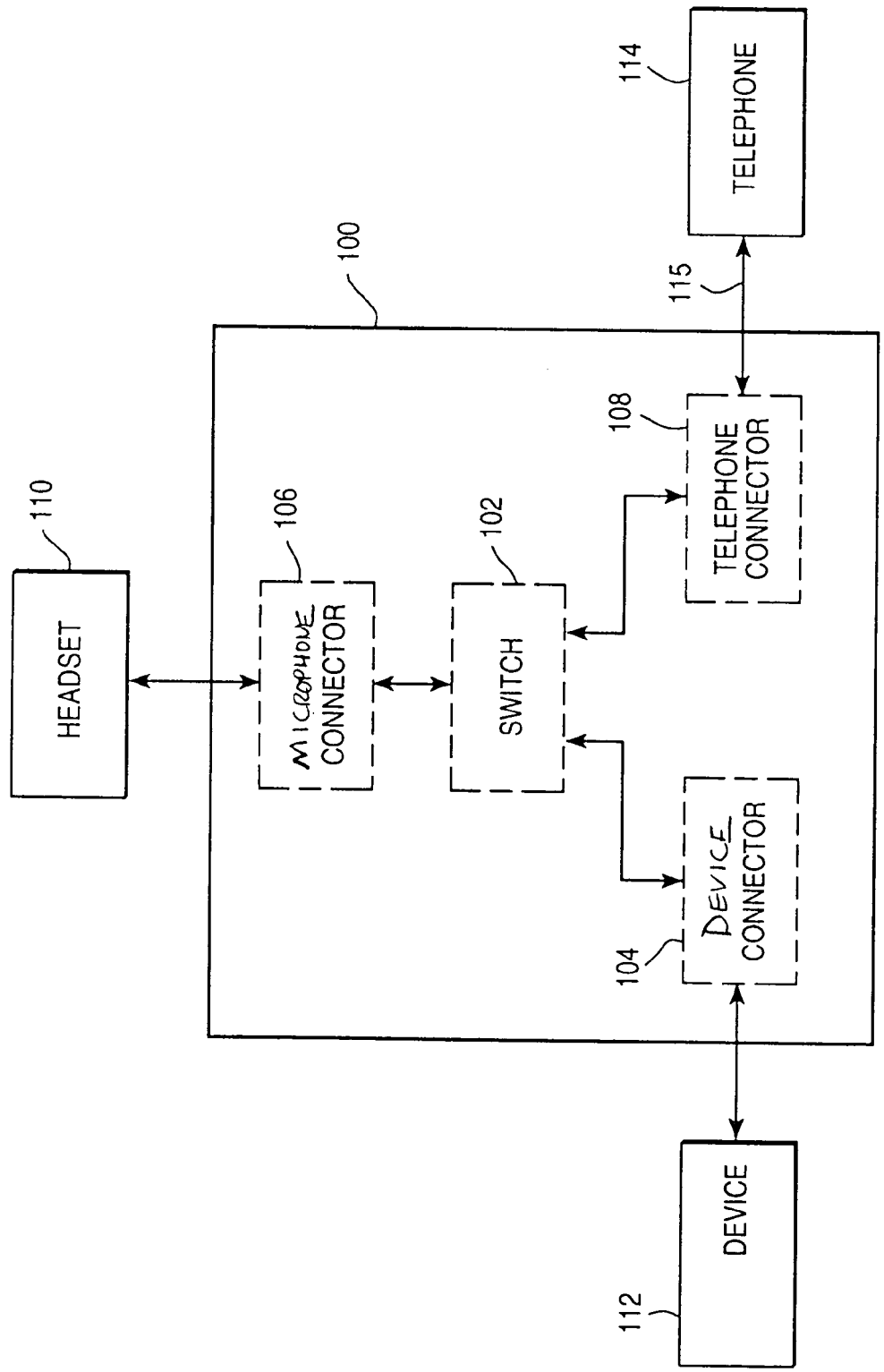
FIG. 1 is a block diagram of a headset switching apparatus according to the present invention.

FIG. 1 is a block diagram of a headset 110 whose microphone is connected to a switching apparatus 100 via connector 106, in accordance with the present invention. Switching apparatus 100 includes a connector 104 for an alternative device 112 and a connector 108 that connects to a telephone line 115 which is also connected to telephone 114. Connector 106 is switched from connector 104 to connector 108 when voltage-sensing switch 102 detects a voltage greater than a predetermined threshold voltage across the telephone connector 108. This voltage difference is generated when telephone 114 goes off hook. When telephone 114 goes back on hook, voltage-sensing switch 102 detects the change in voltage on connector 108 and reconnects connector 106 to connector 104.

Figure 2:
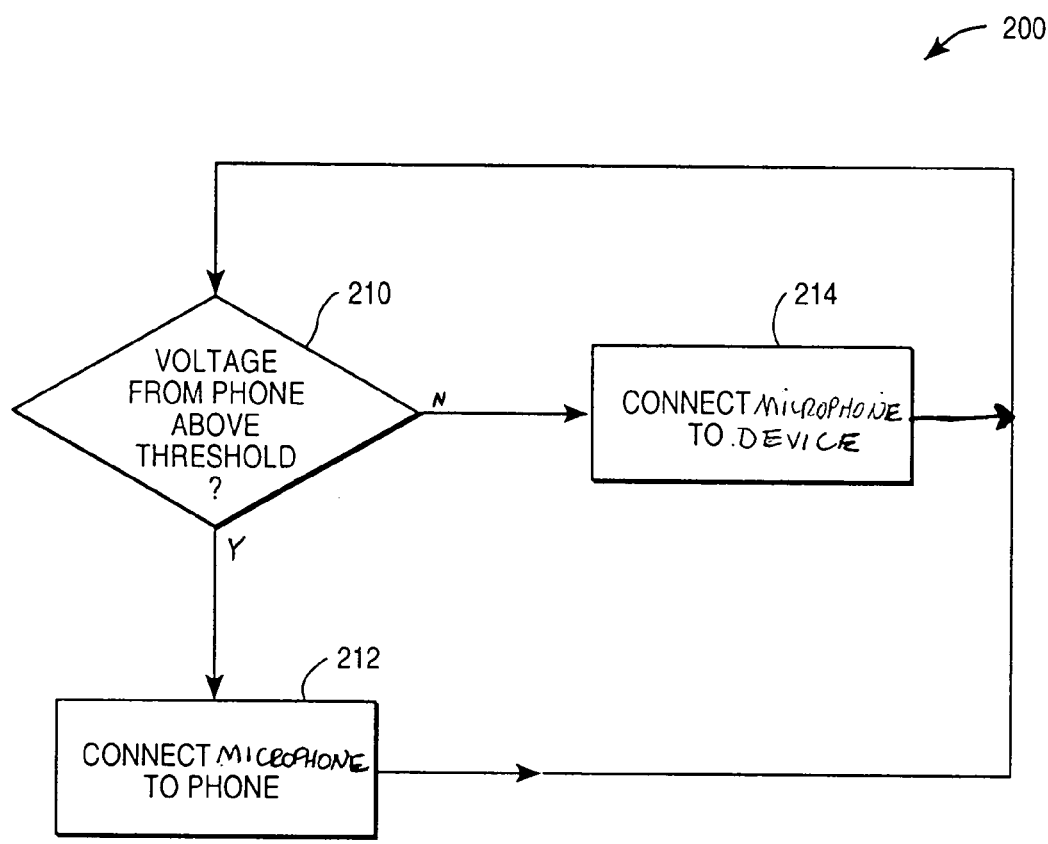
FIG. 2 is a flow chart of the steps of the present invention.

FIG. 2 shows steps of a method 200 in accordance with the present invention. The method begins with a step 210. At step 210, voltage from telephone 114 is monitored. If the voltage from telephone 114 is greater than a predetermined threshold, the microphone of headset 110 is connected to the telephone, at a step 212. This routes the headset's talk path to the telephone. The method then proceeds to step 210, and continues to monitor the voltage. When the voltage drops below the threshold, headset 110 is connected to alternative device 112, at a step 214. The method then proceeds to step 210, and continues to monitor the voltage.

While the present invention has been described in terms of a separate module, it will be apparent to those skilled in the art that an off-hook switching circuit can be provided in the present invention which performs the operation of taking the telephone off-hook in response to depressing a button or throwing a switch. Similarly, the present invention may be included in computer systems as part of a telephony board.

Figure 3:
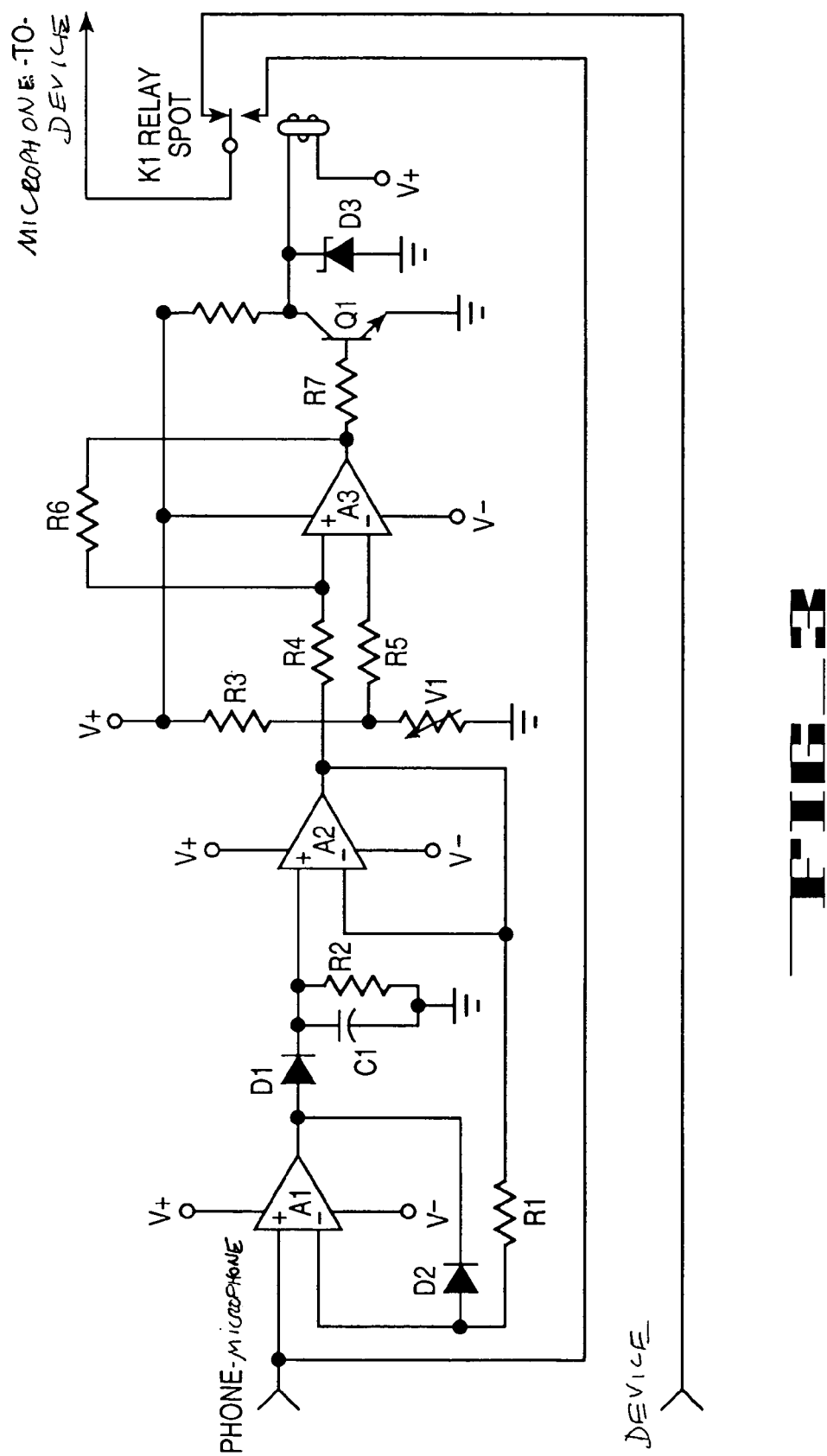
FIG. 3 is a diagram of a circuit used to implement the present invention.

An implementation of the invention is shown in FIG. 3. The device shown in FIG. 3 comprises three diodes, three op-amps, 8 resistors, a capacitor, a varistor, a relay, and a transistor.

Diode D1 and op-amp A1 combine to form a super diode in a peak rectifier circuit. The super diode combines with capacitor C1 and resistor R2 to serve as a precision peak-hold rectifier. If input (line voltage) is greater than the output of the op-amp A1, diode D1 will be ON and will close the negative feedback loop through a buffer op-amp A2 and resistor R1. The output voltage of op-amp A1 then will follow the input and supply the current to charge the holding capacitor C1. Beyond the positive peak of the input voltage, op-amp A1 will see a negative input. This causes the output to be negative and turns off diode D1.

Op-amp A2 serves as a buffer with high input impedance and low bias current. This allows the discharge-time/holding-time to be controlled precisely by resistor R2. Note that additional diode D2 is in the circuit to act as a caching diode to prevent negative saturation and delay of op-amp A1.

Third op-amp A3 with its associated components serves as a simple positive feedback comparator with hysteresis. The inverting input voltage is set at a desired threshold value. Note that varistor V1 allows the user to vary switch level according to his or her unique equipment. The rest of the circuit at the output of op-amp A3 is used to drive relay K1.

Figure 4:
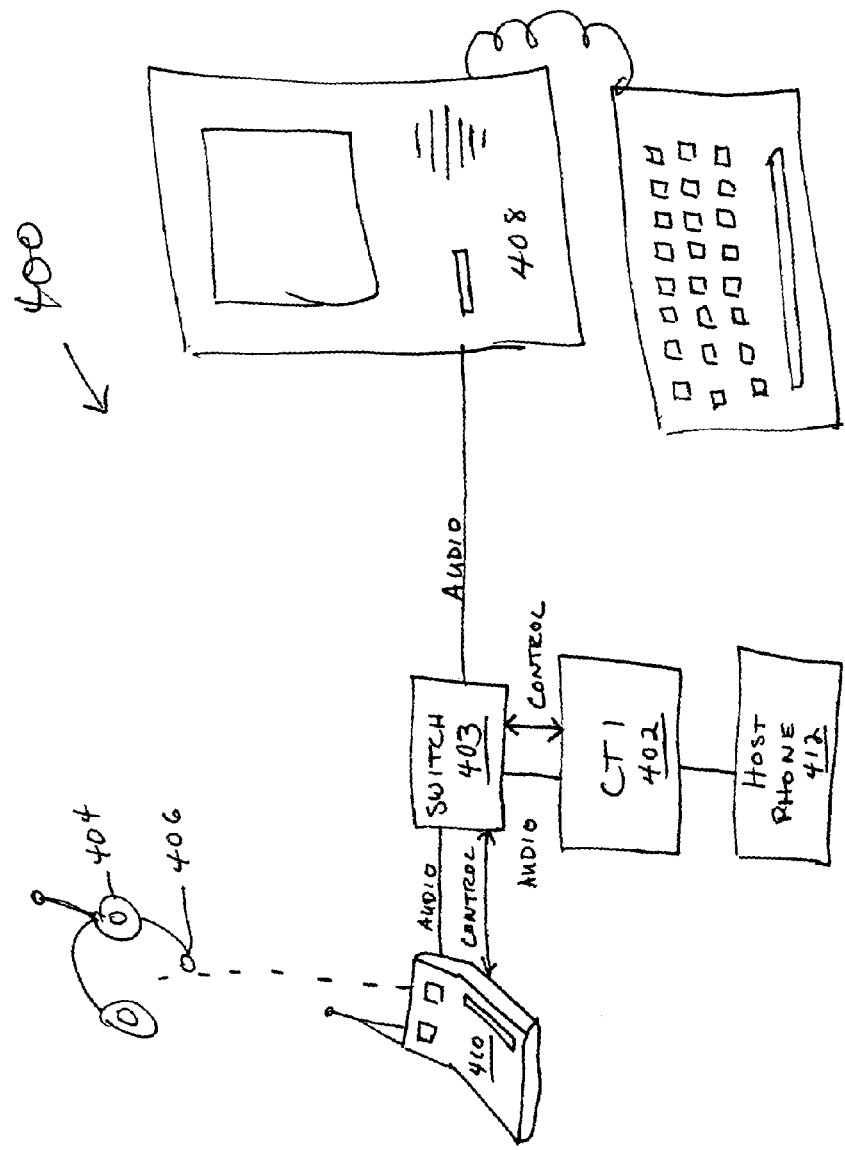
FIG. 4 is a diagram of components used in the present invention.

A system 400 uses a computer telephone integration (CTI) headset module 402, as shown in FIG. 4. In FIG. 4, a switch 403 is external to the CTI module. The control signals from the CTI module 402 and the wireless base module 410 are used by the switch module 403 to switch the audio path. The audio path headset microphone 406 is switched between a phone 412 attached to the CTI and the external device (in this example, computer 408).

Figure 5:
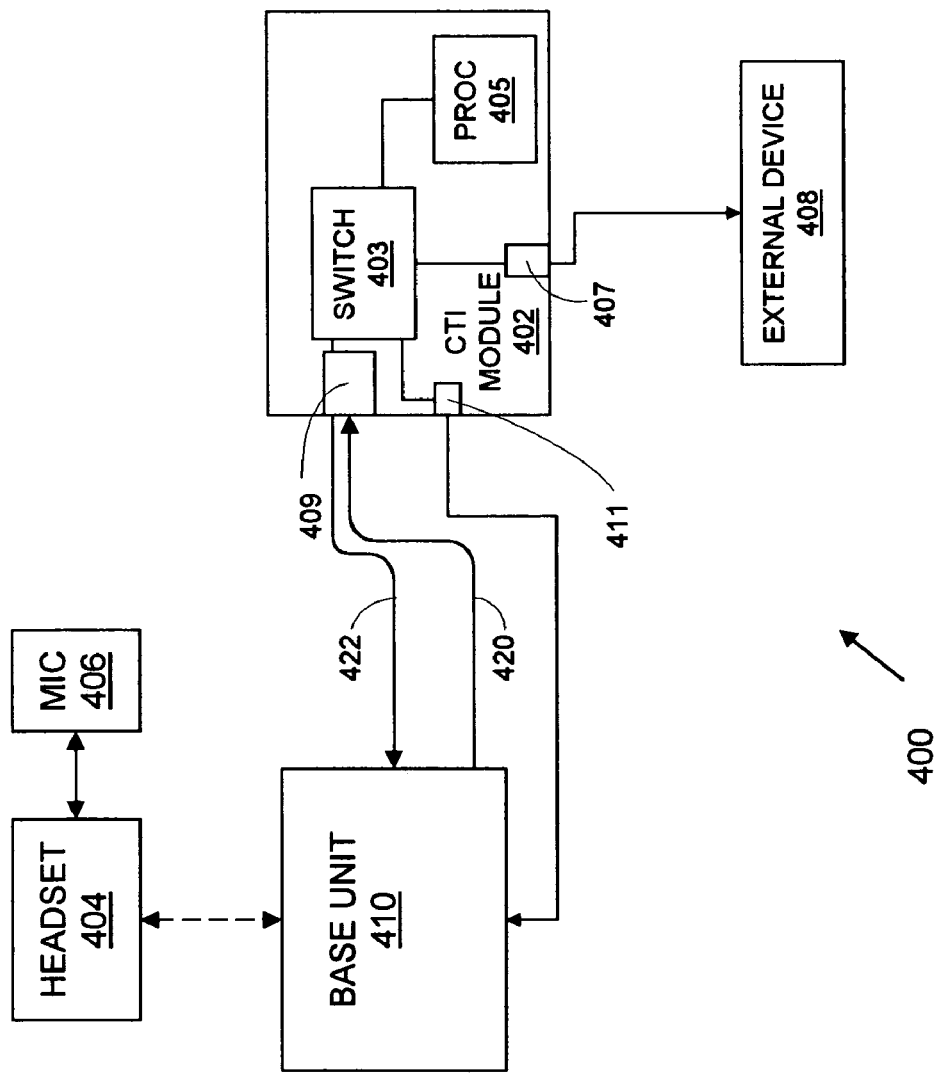
FIG. 5 is a block diagram showing the function of components of FIG. 4.

In the embodiment shown in FIG. 5, the CTI module includes a switch 403, a processor 405, and three RJ-11 ports, audio ports 407 and 411, and a control port 409. Two control signals, illustrated by arrows 420 and 422, connect the base unit and control port 409. The CTI provides a signal (depicted by arrow 422) to communicate that the phone is off-hook (or, alternatively, ringing). The headset base 410 provides another signal (depicted by arrow 420) to indicate that the base is active. When both of these signals are false, a switch in the module routes the microphone's talk path to the computer 408 (or, alternatively, to another external output). Otherwise, the output is routed to the telephone via audio port 411.

In a wireless system, signals between the components can be by infrared or radio signal. (The dashed line between headset 404 and base unit schematically illustrates a wireless connection.) As will be apparent to those skilled in the art, a system in accordance with the present invention can be implemented by a combination of wireless signals and wires. For example, signals between the headset and base unit and between the base unit and module can be wireless, while signals between a plug-in module and PC travel by wire.

The CTI can optionally include speech recognition. In one embodiment, a voice command recognized by the speech recognition function switches from the telephone call to the PC. The voice command automatically mutes the telephone call and switches to the computer. When the computer function is finished, the user uses a second voice command that automatically releases the mute and switches the talk path back to the telephone microphone. The voice recognition switching function uses voice recognition software in base unit 410 to switch the talk path from the telephone to computer 408. Computer 408 also includes voice recognition software.

The invention can be used in conjunction with the system described in co-pending application Ser. No. 08/747,468, "Apparatus and Method for Automatically Switching a Headset Between a Telephone and a Second Audio Source" by Iglehart et al., which is incorporated herein by reference. That application describes switching the speaker (audio) portion of the headset. Used in combination with the invention described herein, a user can switch either or both of the speaker and microphone functions between telephone headset functions and auxiliary devices such as computers, speakers, and recording devices. The invention is applicable to other embodiments than a headset and telephone. For example, a microphone in a speaker phone could be used alternately to communicate with a computer and a telephone. In a car, a cordless telephone and alternative device could alternately use the same microphone. Various other modifications to the present invention will become apparent to those skilled in the art from the foregoing description and accompanying drawings. Accordingly, the present invention is to be limited solely by the scope of the following claims.

What is claimed is:

1. An apparatus for connecting a microphone alternately to a telephone line and an alternative device, said apparatus comprising:
 a device connector for connecting said apparatus to said alternative device;
 a telephone connector for connecting said apparatus to said telephone line;
 a microphone connector for connecting said apparatus to said microphone; and
 a switching circuit connected to said device, telephone and microphone connectors, said switching circuit connecting said telephone connector to said microphone connector in response to sensing a voltage greater than a predetermined threshold on said telephone line, and said switching circuit connecting said microphone connector to said alternative device connector when the voltage sensed on said telephone line is less than said predetermined threshold voltage.

2. An apparatus as in claim 1 wherein said switching circuit is included in a computer telephone integration (CTI) module.

3. An apparatus as in claim 1 wherein said device is a personal computer.

4. An apparatus for connecting a headset alternately to a telephone line and an alternative device, said apparatus comprising:
 a device connector for connecting said apparatus to said alternative device; a telephone connector for connecting said apparatus to said telephone line;
 a microphone connector for connecting said apparatus to said headset; and
 a switching circuit connected to said device, telephone and headset connectors, said switching circuit connecting said telephone connector to said headset connector in response to sensing a voltage greater than a predetermined threshold on said telephone line, and said switching circuit connecting said headset connector to said device connector when the voltage sensed on said telephone line is less than said predetermined threshold voltage.

5. An apparatus as in claim 4 wherein said switching circuit is included in a computer telephone integration (CTI) module.

6. An apparatus as in claim 4 wherein said device is a personal computer.

7. A method for connecting a microphone alternately to an alternative device and a telephone line, said method comprising the steps of:
 connecting said microphone, telephone line, and alternative device to a switching device;
 sensing the voltage on said telephone line; and
 switching said microphone to said telephone line whenever said voltage is greater than a predetermined threshold voltage, and to said alternative device whenever said voltage is less than said predetermined voltage.

8. A method as in claim 7 wherein said switching is implemented by a computer telephone integration (CTI) module.

9. An apparatus as in claim 7 wherein said device is a personal computer.

10. A method for connecting a headset alternately to an alternative device and a telephone line, said method comprising the steps of:
- connecting said headset, telephone line, and alternative device to a switching device;
- sensing the voltage on said telephone line; and
- switching said headset to said telephone line whenever said voltage is greater than a predetermined threshold voltage, and to said alternative device whenever said voltage is less than said predetermined voltage.

11. A method as in claim 10 wherein said switching is implemented by a computer telephone integration (CTI) module.

12. An apparatus for switching alternately between a personal computer and a telephone, comprising:
- a device connector for connecting said apparatus to said personal computer;
- a telephone connector for connecting said apparatus to said telephone line;
- a microphone connector for connecting said apparatus to said microphone; and
- a switching circuit connected to said device, telephone and microphone connectors, said switching circuit connecting said telephone connector to said microphone connector in response to recognizing a first voice command, and said switching circuit connecting said microphone connector to said device connector in response to recognizing a second voice command.

13. An apparatus as in claim 12 wherein said switching circuit is included in a computer telephone integration (CTI) module.

14. An apparatus for connecting a microphone, for conveying of audio signals from said microphone, to, at a given time, no more than one of a telephone line and an alternative device, said apparatus comprising:
- a device connector for connecting said apparatus to said alternative device;
- a telephone connector for connecting said apparatus to said telephone line;
- a microphone connector for connecting said apparatus to said microphone; and
- a switching circuit connected to said device, telephone and microphone connectors, said switching circuit connecting said telephone connector to said microphone connector in response to sensing a high voltage on said telephone line, and said switching circuit connecting said microphone connector to said alternative device connector in response to sensing a low voltage on said telephone line, wherein said high voltage and said low voltage are defined according to predetermined voltage thresholding.

15. An apparatus as in claim 14 wherein said switching circuit is included in a computer telephone integration (CTI) module.

16. An apparatus as in claim 14 wherein said device is a personal computer.

17. A method for connecting a microphone to, at a given time, no more than one of an alternative device and a telephone line, said method comprising the steps of:
- connecting said microphone, telephone line, and alternative device to a switching device;
- sensing the voltage on said telephone line; and
- switching, for conveying of audio signals from said microphone, said microphone to said telephone line in response to said voltage being high, and to said alternative device in response to said voltage being low, said high and low being defined according to predetermined voltage thresholding.

18. A method as in claim 17 wherein said switching is implemented by a computer telephone integration (CTI) module.

19. An apparatus as in claim 17 wherein said device is a personal computer.

20. An apparatus for switching between a personal computer and a telephone, comprising:
- a device connector for connecting said apparatus to said personal computer;
- a telephone connector for connecting said apparatus to said telephone line;
- a microphone connector for connecting said apparatus to said microphone; and
- a switching circuit connected to said device, telephone and microphone connectors, said switching circuit connecting said telephone connector to said microphone connector in response to recognizing a first voice command, and said switching circuit connecting said microphone connector to said device connector in response to recognizing a second voice command;
- wherein said switching circuit is included in a computer telephone integration (CTI) module.

* * * * *